US009593751B2

(12) United States Patent
Lee

(10) Patent No.: US 9,593,751 B2
(45) Date of Patent: Mar. 14, 2017

(54) SWIVELING ACTUATOR

(71) Applicant: LG INNOTEK CO., LTD., Seoul (KR)

(72) Inventor: Su Hyoung Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 500 days.

(21) Appl. No.: 13/904,265

(22) Filed: May 29, 2013

(65) Prior Publication Data
US 2013/0319146 A1    Dec. 5, 2013

(30) Foreign Application Priority Data

May 29, 2012 (KR) .................. 10-2012-0056570

(51) Int. Cl.
*F16H 25/20* (2006.01)
*B60Q 1/076* (2006.01)

(52) U.S. Cl.
CPC ............. *F16H 25/20* (2013.01); *B60Q 1/076* (2013.01); *Y10T 74/18576* (2015.01)

(58) Field of Classification Search
CPC ........... F16H 2025/2043; F16H 37/122; B60Q 1/0683; B60Q 1/124
USPC ................................ 74/89.23, 104
See application file for complete search history.

(56) References Cited

U.S. PATENT DOCUMENTS

| RE22,544  | E  | * | 9/1944  | Tinnerman ................ 411/522 |
| 3,113,469 | A  | * | 12/1963 | Muller ...................... 74/499 |
| RE29,253  | E  | * | 6/1977  | Daghe et al. ............... 251/228 |
| 5,079,964 | A  | * | 1/1992  | Hamada et al. ............ 74/89.25 |
| 5,085,401 | A  | * | 2/1992  | Botting et al. ........... 251/129.11 |
| 5,112,153 | A  | * | 5/1992  | Gunn ................ F16C 11/0628 403/69 |
| 6,478,457 | B1 | * | 11/2002 | Manley ...................... 362/465 |
| 7,223,001 | B2 | * | 5/2007  | Pfister et al. ............... 362/523 |
| 7,444,900 | B2 | * | 11/2008 | Tomaru ................ B62D 1/181 74/493 |

(Continued)

FOREIGN PATENT DOCUMENTS

CN    102155704 A     8/2011
EP    1710122 A1     10/2006

(Continued)

OTHER PUBLICATIONS

Office Action dated May 13, 2014 in Japanese Application No. 2013-112039.
European Search Report in European Application No. EP 13169467.

*Primary Examiner* — Victor MacArthur
(74) *Attorney, Agent, or Firm* — Saliwanchik, Lloyd & Eisenschenk

(57) ABSTRACT

Disclosed is a swivel actuator, the swivel actuator including a driving motor, a linear screw shaft rotating in conjunction with rotational force of the driving motor, a nut member reciprocating to a lengthwise direction of the linear screw shaft in response to the rotation of the linear screw shaft, a lever member, one end of which being rotatably coupled to the nut member and the other end being connected to a rotating counterpart, and an elastic member arranged at a coupled position between the nut member and the lever member to maintain a coupling between the nut member and the lever member by applying elastic restoring force to the lever member.

8 Claims, 4 Drawing Sheets

(56) References Cited

U.S. PATENT DOCUMENTS

| | | | | |
|---|---|---|---|---|
| 7,909,475 B2* | 3/2011 | Jeon et al. | ...................... | 362/35 |
| 2001/0036080 A1* | 11/2001 | Shirai | ........................... | 362/460 |
| 2004/0090780 A1* | 5/2004 | Burton | ........................... | 362/273 |

FOREIGN PATENT DOCUMENTS

| EP | 1854665 A1 | 11/2007 |
|---|---|---|
| JP | 5925542 A | 2/1984 |
| JP | 2004-068944 A | 3/2004 |
| KR | 20100037363 A | 4/2010 |

\* cited by examiner

SWIVELING ACTUATOR

CROSS-REFERENCE TO RELATED APPLICATION

This application claims the benefit under 35 U.S.C. §119 of Korean Application No. 10-2012-0056570, filed May 29, 2012, which is hereby incorporated by reference in its entirety.

BACKGROUND OF THE INVENTION

Field of the Invention

The teachings in accordance with exemplary and non-limiting embodiments of this invention relate generally to a swiveling actuator configured to change a rotational power to a rectilinear motion and output the rectilinear motion.

Description of Related Art

This section provides background information related to the present disclosure, which is not necessarily prior art.

Generally, a motor outputs a rotational force generated by rotation of a rotor about a shaft in response to an electromagnetic interaction between the rotor and a stator. The power outputted by the motor is a rotational force, so that it is possible to move a mechanism to a desired direction using the rotational force.

Meantime, in order to move a mechanism for a rectilinear motion instead of rotation, a power transmission unit is needed to change a rotational motion to a rectilinear motion. The power transmission unit capable of changing the rotational motion to the rectilinear motion may include a crank, a lead screw shaft, a swiveling actuator and the like. The swivel(ing) actuator among these power transmission units may be used for multiple purposes, and is recently applied to a variable head lamp configured to obtain a maximum night view for a driver in conjunction with a steering direction of the driver.

As one of prior art, Korean Patent Laid-Open No. 10-2010-0037363 (opened on Apr. 9, 2010) discloses a swivel actuator applied to the variable head lamp, in which a nut member gear-coupled to a lead screw rotating by receiving a driving force of a motor reciprocates in conjunction with rotation of the lead screw, and a link member connected to an upper coupling lug of the nut member horizontally reciprocates to horizontally change an irradiation direction of a head lamp.

However, the swivel actuator thus configured suffers from disadvantages in that a connection area of the link member connected to a lug prevents generation of a gap by way of press-fitting, such that a load and a noise are generated on the swivel actuator to increase friction during repetitive operation.

Another disadvantage is that a step power loss of a driving motor provided in the form of a stepping motor may be generated during a process of changing a rectilinear motion of the nut member to a rotational motion, and legibility of luminous intensity (allowing light irradiated from a head lamp to accurately reach a driving path requiring an illumination by a driver) may deteriorate, in a case a gap is generated by dimensional instability.

BRIEF SUMMARY

This section provides a general summary of the disclosure, and is not a comprehensive disclosure of its full scope or all of its features.

Exemplary aspects of the present disclosure are to substantially solve at least the above problems and/or disadvantages and to provide at least the advantages below.

The present disclosure is directed to provide a structure-improved swivel actuator configured to reduce a load applied to a driving motor and a noise during operation of the driving motor, and to implement a normal operation even if a manufacturing error caused by dimensional instability is generated during manufacturing of constituent parts.

Technical problems to be solved by the present disclosure are not restricted to the above-mentioned descriptions, and any other technical problems not mentioned so far will be clearly appreciated from the following description by skilled in the art.

In one general aspect of the present invention, there is provided a swivel actuator, the swivel actuator comprising: a driving motor; a linear screw shaft rotating in conjunction with rotational force of the driving motor; a nut member reciprocating to a lengthwise direction of the linear screw shaft in response to the rotation of the linear screw shaft; a lever member, one end of which being rotatably coupled to the nut member and the other end being connected to a rotating counterpart; and an elastic member arranged at a coupled position between the nut member and the lever member to maintain a coupling between the nut member and the lever member by applying elastic restoring force to the lever member.

Preferably, but not necessarily, the linear screw shaft may be formed at a periphery with a screw thread, one end being connected to a rotation shaft of the driving motor, the other end being rotatably connected to a rotation accommodation unit provided to a base.

Preferably, but not necessarily, the nut member may include a lug unit protrusively formed on the nut member, and a linear screw shaft coupling hole formed with a female screw unit gear-coupled to the linear screw shaft.

Preferably, but not necessarily, the elastic member may be protrusively formed at a periphery of the lug unit Preferably, but not necessarily, the elastic member may include any one of a rubber member, a tension rib and a leaf spring.

Preferably, but not necessarily, the elastic member may be arranged near to a distal end of the lug unit Preferably, but not necessarily, the lever member may include a head formed on a surface facing the lug unit with a lug accommodation groove rotatably accommodating the lug unit.

Preferably, but not necessarily, the lug unit may take a shape of a cylinder, and the lug accommodation groove of the head is formed with a width corresponding to a diameter of the lug unit, and formed with an opening unit opened on at least two areas and a pair of lateral walls gripping the lug unit.

Preferably, but not necessarily, the elastic member may be protrusively formed on a surface opposite to the lateral wall.

The exemplary and non-limiting embodiments of the present disclosure have an advantageous effect in that friction is minimized during operation of the swivel actuator to minimize a load loss of a driving motor and to improve durability.

Another advantage is that an operational noise caused by friction can be reduced by a reduced load of a driving motor, and a lug unit and a head can constantly maintain a tightly closed state by an elastic member, even if assembly is completed under a dimensional instability of constituent parts, to enhance an operational reliability of the swivel actuator.

BRIEF DESCRIPTION OF THE DRAWINGS

In the drawings, the width, length, thickness, etc. of components may be exaggerated or reduced for the sake of convenience and clarity. Furthermore, throughout the descriptions, the same reference numerals will be assigned to the same elements in the explanations of the figures, and explanations that duplicate one another will be omitted. Now, a voice coil motor according to the present disclosure will be described in detail with reference to the accompanying drawings.

The teachings of the present disclosure can be readily understood by considering the following detailed description in conjunction with the accompanying drawings, in which.

DETAILED DESCRIPTION

Advantages and features of the present disclosure may be understood more readily by reference to the following detailed description of exemplary embodiments and the accompanying drawings. Detailed descriptions of well-known functions, configurations or constructions are omitted for brevity and clarity so as not to obscure the description of the present disclosure with unnecessary detail. Thus, the present disclosure is not limited to the exemplary embodiments which will be described below, but may be implemented in other forms. Accordingly, the described aspect is intended to embrace all such alterations, modifications, and variations that fall within the scope and novel idea of the present disclosure.

The meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Now, exemplary embodiments of the present disclosure will be explained in detail together with the figures.

Figure 1:
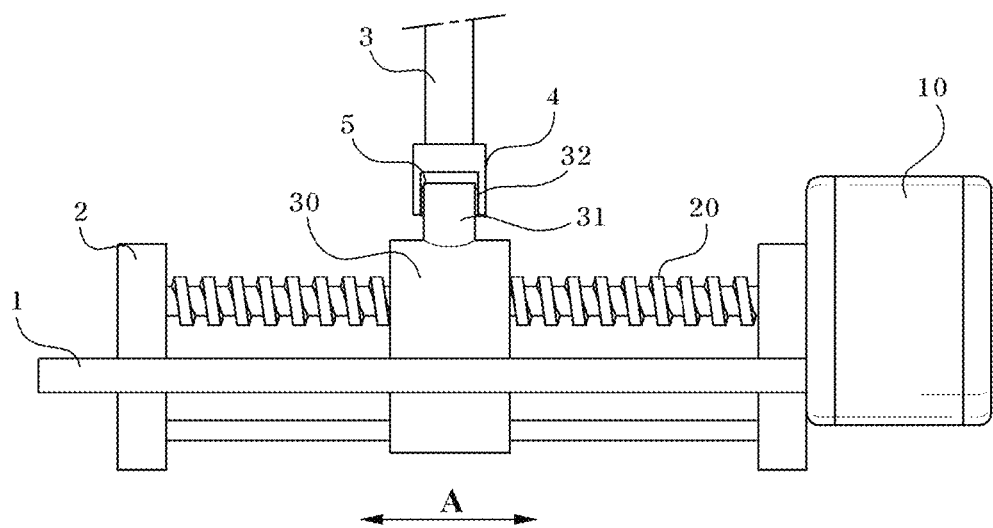
FIG. 1 is a schematic structural view illustrating a swivel actuator according to an exemplary embodiment of the present disclosure.
Figure 2:
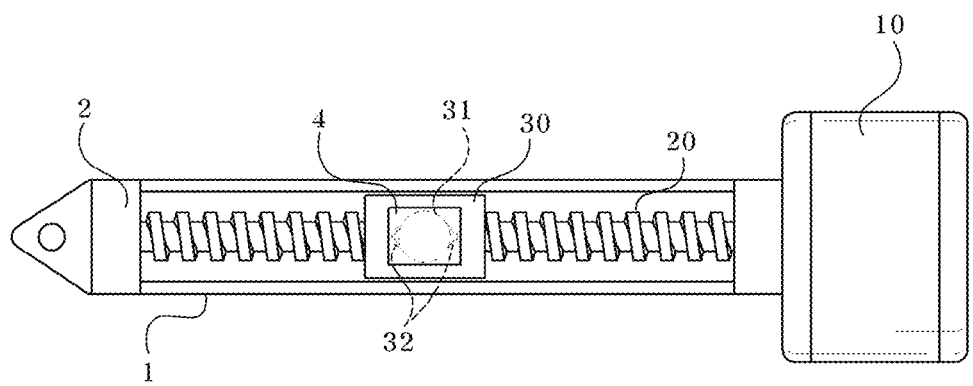
FIG. 2 is a front view of FIG. 1.
Figure 3:
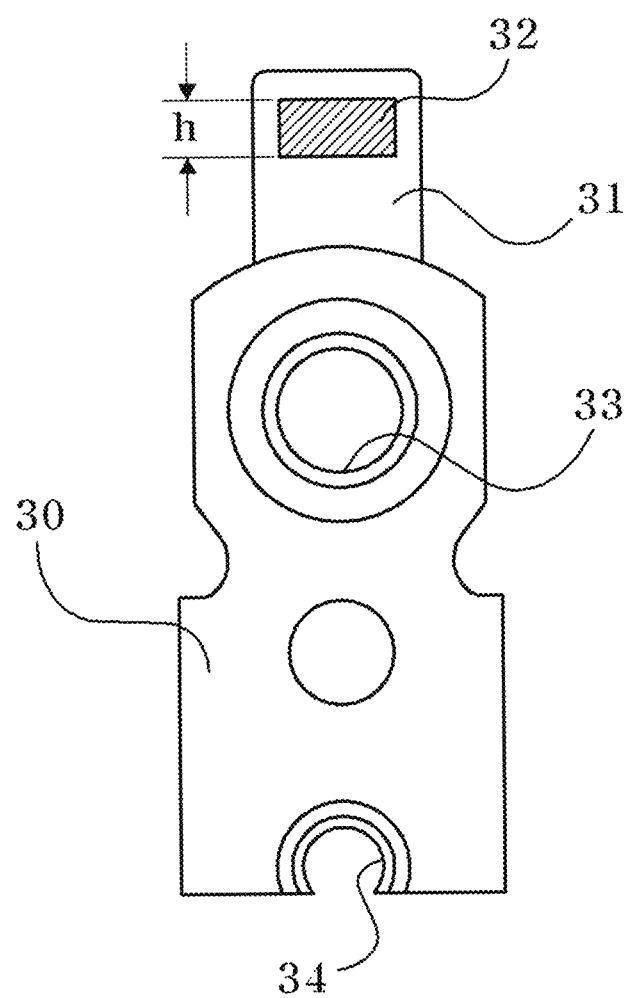
FIGS. 3 and 4 are schematic views illustrating a nut member according to an exemplary embodiment of the present disclosure.
Figure 4:
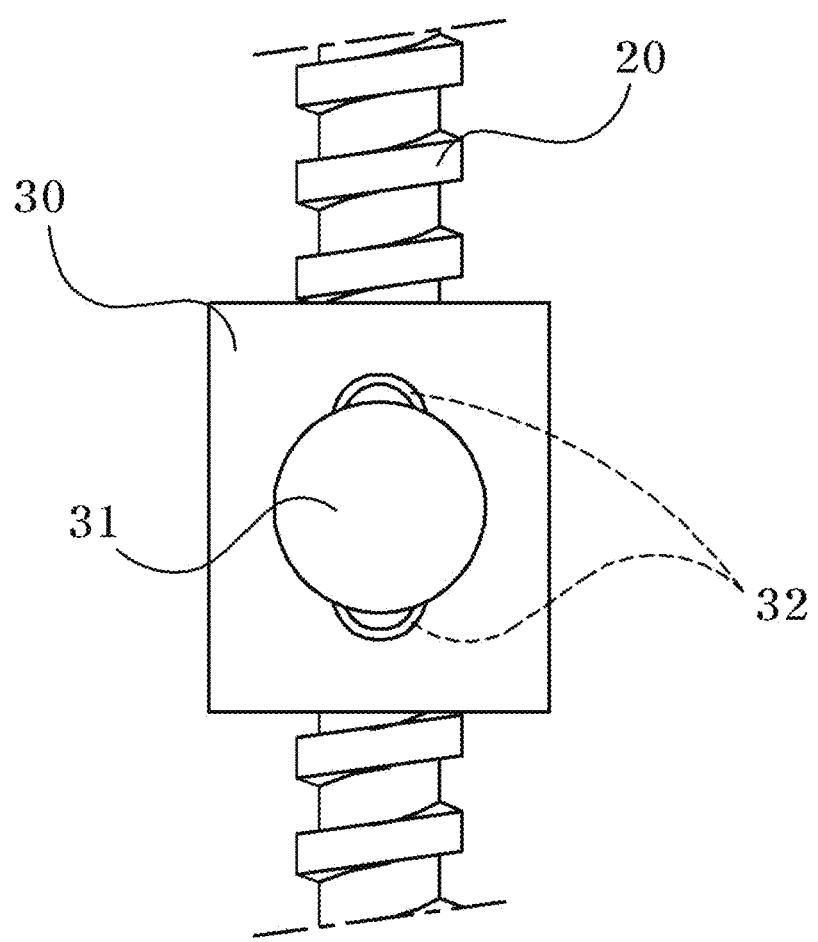
Figure 5:
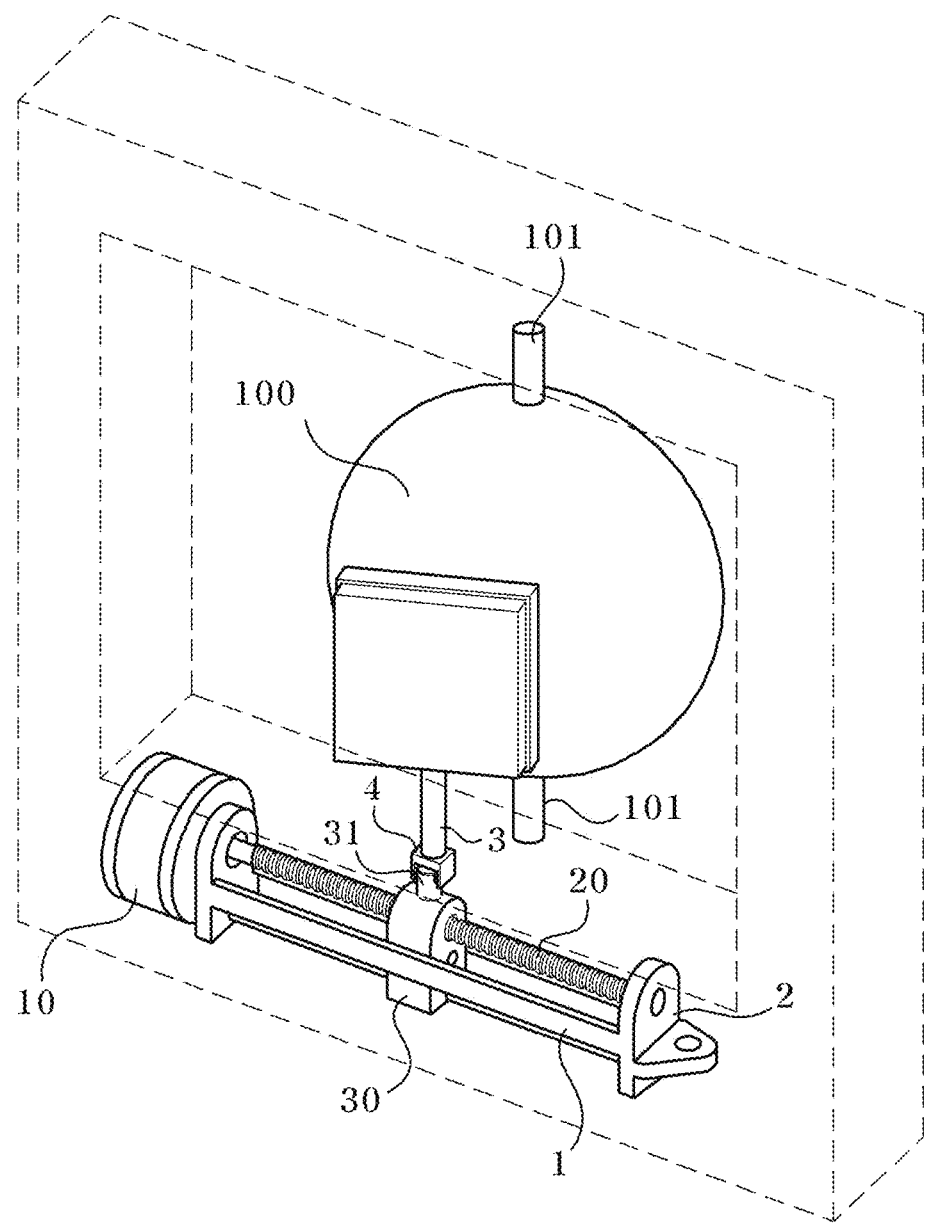
FIG. 5 is a schematic structural view illustrating a vehicular head lamp swivel structure applied with a swivel actuator according to an exemplary embodiment of the present disclosure.

FIG. 1 is a schematic structural view illustrating a swivel actuator according to an exemplary embodiment of the present disclosure, FIG. 2 is a front view of FIG. 1, FIGS. 3 and 4 are schematic views illustrating a nut member according to an exemplary embodiment of the present disclosure, and FIG. 5 is a schematic structural view illustrating a vehicular head lamp swivel structure applied with a swivel actuator according to an exemplary embodiment of the present disclosure.

Referring to FIG. 1, a swivel actuator according to an exemplary embodiment of the present disclosure includes a driving motor (10), a lead screw shaft (20) and a nut member (30).

A stepping motor capable of performing a precision control is widely used for the driving motor (10) and an output shaft of the driving motor (10) may be connected to the lead screw shaft (20).

Referring to FIGS. 1 and 2, the lead screw shaft (20) may be formed at a periphery with a screw thread, one end of which being connected to a rotation shaft of the driving motor (10) to receive a driving power, and the other end of which rotatably being coupled to a rotational accommodation member mounted at a rotational accommodation unit (2) provided at a base (1) via a bearing, and may rotate while maintaining a horizontal position with the rotation shaft of the driving motor (10).

The nut member (30) may be screw-coupled to the lead screw shaft (20), and reciprocate to an arrow 'A' direction along a lengthwise direction of the lead screw shaft (20) in conjunction with the rotational operation of the lead screw shaft (20).

Referring to FIGS. 1 and 2 again, an upper surface of the nut member (30) may be provided with a cylindrical lug unit (31) coupled by a lever member (3). A distal corner portion of the lug unit (31) may be rounded to allow an easy coupling with the lever member (3).

The elastic member (32) may be formed on a periphery of the lug unit (31) more protrusively than the periphery of the lug unit (31). The elastic member (32) may be protrusively formed from a part of the periphery of the lug unit (31), and preferably, as shown in FIGS. 3 and 4, the elastic member (32) may be protrusively formed to a direction not interfered with a rotational direction of the lever member (3) relative to reciprocating motion of the nut member (30).

That is, as shown in FIG. 4, a protruding direction of the elastic member (32) may be a direction parallel with a lengthwise direction of the lead screw shaft (20) and the elastic member (32) may be protruded to a moving direction of the nut member (30) to allow an inner surface of the head (4) to be elastically pressed by the elastic member (32), in a case the head (4, see FIGS. 1 and 2) of the lever member (3) coupled to the lug unit (31) is rotated at the lug unit (31).

At this time, the head (4), as illustrated in FIGS. 1 and 5, may be preferably formed a pair of wall surfaces and may include a lug accommodation groove (5) having an opening opened on at least two areas, and it may be preferable that the elastic member (32) is protrusively formed at a position opposite to the wall surface of the lug accommodation groove (5) of the lug unit (31). Meantime, a width of the lug accommodation groove (5) may be a bit greater than a diameter of the lug unit (31) and may be preferably greater than a protruded size of the elastic member (32) during a maximum compression.

Referring to FIG. 3, the elastic member (32) may be formed with a rubber material having a predetermined height (h), but may be formed with other materials and shapes as necessary. By way of non-limiting example, in a case a shape of a partial portion of the lug unit (31) is formed with an elastically deformable tension rib, an encumbrance of assembling and coupling a separate elastic member (32) can be eliminated, and an elastically deformable material such as a leaf spring, aside from the rubber material, may be used for the elastic member (32).

Furthermore, a height (h) of the elastic member (32) may be preferably formed with a smaller size than that of a height of the lug unit (31). If the height (h) of the elastic member (32) is formed greater than the height of the lug unit (31), a frictional force between the head (4) and the lug unit (31) may be excessively enlarged to generate a noise due to an increased load of the driving motor (10). Conversely, if the height (h) of the elastic member (32) is formed excessively lower than the height of the lug unit (31), the elastic member (32) may not apply a sufficient repulsive force to the head (4) to disable a maintenance of coupling between the head (4) and the lug unit (31), such that the height (h) of the elastic member (32) needs to be configured with a magnitude sufficient enough to form an elastic restoring force generated during coupling with the head (4) capable of maintaining the coupling between the head (4) and the lug unit (31).

A linear screw shaft coupling hole (33) may be formed at a bottom surface of the lug unit (31) and may be formed at an inner surface with a female screw unit gear-coupled to the linear screw shaft (20). A guide unit (34) may be coupled to a guide rod (not shown) mounted at the base (1) to enable the nut member (30) to reciprocate to a predetermined direction.

Now, an operation of the swivel actuator according to an exemplary embodiment of the present disclosure will be described with accompanying drawings.

Referring to FIG. 1, in a case the driving motor (10) is rotated, the lead screw shaft (20) may be rotated by receiving a power of the driving motor (10), and the nut member (30) may be reciprocated to an arrow "A" direction in response to rotation of screw thread formed at a periphery of the lead screw shaft (20).

Meanwhile, because the lug unit (31) is formed at an upper surface of the nut member (30), and the lug unit (31) is rotatably coupled to the head (4) of the lever member (3), the head (4) may be rotated about the lug unit (31) to allow the lever member (3) to reciprocate along with the nut member (30), in a case the nut member (30) is reciprocated to an arrow "A" direction.

At this time, the elastic member (32) is brought into a tight contact with a wall surface of the lug accommodation groove (5) formed at an inner surface of the head (4) and applies a pressing force in response to the elastic restoring force to thereby allow maintaining the coupling between the head (4) and the lug unit (31), in a case the head (4) is rotated and moved about the lug unit (31) in response to reciprocating motion of the nut member (30).

In a case the lug accommodation groove (5) is tightly contacted to the elastic member (32) but is spaced apart from the lug unit (31) at a predetermined distance, the head (4) can be rotated with a minimum frictional force over the case where the lug unit (31) and the lug accommodation groove (5) are press-fitted, and particularly, the load of the driving motor (10) can be reduced to alleviate generation of operational noise over the conventional press-fitted coupling method.

Furthermore, the elastic member (32) is surface-contacted to the lug accommodation groove (5) at an inner surface of the head (4) to allow maintaining the coupling between the lug unit (31) and the lug accommodation groove (5) at all times, whereby a normal operation is possible, even if dimensional instability is generated during the manufacturing process of the lug unit (31) or the lug accommodation groove (5).

As noted from the foregoing, the swivel actuator is useable to various devices, and by way of non-limiting example, as illustrated in FIG. 5, the swivel actuator may be used to a lamp swivel device configured to change a direction light generated from a head lamp (100) of a vehicle. That is, in a case the lever member (3) is reciprocated to the arrow "A" direction of FIG. 1, the head lamp (100) may be rotated about a head lamp driving unit (101) to change a direction of irradiation by the head lamp (100) in response to reciprocating motion of the lever member (3).

That is, the lug accommodation groove (5) is preferably opened at a partial surface to allow the lug unit (31) to move to a direction crossing a moving direction of the lug unit (31). This is to absorb a coupling error therebetween because the lug unit (31) performs a rectilinear motion in response to reciprocating motion of the nut member (30), and the lug accommodation groove (5) performs a curved motion about the head lamp driving unit (101) of the head lamp (100).

To be more specific, as illustrated in FIG. 5, the head lamp (100) performs a rotating motion when the lug unit (31) performs a rectilinear motion, at which time, the lever member (3) also performs a rectilinear motion like the lug unit (31) to push the lever member (3) to a moving direction inside the lug accommodation groove (5), whereby the lever member (3) is pushed by the lug unit (31) to perform a curved motion about the head lamp driving unit (101) and is distanced from the lug unit (31).

Thus, the head lamp (100) cannot be smoothly rotated, in a case the lug unit (31) is press-fitted into the lug accommodation groove (5), such that in order for the head lamp (100) to rotate smoothly, the lug accommodation groove (5) may be opened to a direction crossing a moving direction of the lug unit (31) to allow the lug unit (31) to move.

Meanwhile, although the head (4) of the lever member (3) is rotated from the lug unit (31) to move in the shape of an arc about the head lamp driving unit (101), the head lamp (100) is supported at the lug accommodation groove (5) provided at the head (4) by the elastic restoring force of the elastic member (32), such that, even if the head lamp (100) is repetitively moved, there may be generated no defect where connection between the head (4) and the lug unit (31) is released.

The above-mentioned swivel actuator has been illustrated and explained in detail with reference to exemplary embodiments and drawings. However, the swivel actuator according to exemplary embodiments of the present disclosure may, however, be embodied in many different forms and should not be construed as limited to the embodiments set forth herein. Thus, it is intended that embodiments of the present disclosure may cover the modifications and variations of this disclosure provided they come within the scope of the appended claims and their equivalents. While particular features or aspects may have been disclosed with respect to several embodiments, such features or aspects may be selectively combined with one or more other features and/or aspects of other embodiments as may be desired.

What is claimed is:

1. A swivel actuator, the swivel actuator comprising:
    a driving motor;
    a linear screw shaft rotating in conjunction with rotational force of the driving motor,
    a nut member reciprocating in a lengthwise direction of the linear screw shaft in response to the rotation of the linear screw shaft and including a lug unit protrusively formed on the nut member;
    a lever member including a head formed on a surface of the lever member facing the lug unit, the head having a lug accommodation groove rotatably accommodating the lug unit, the head being rotatably coupled to the lug unit, and the lever member being connected to a rotating counterpart; and
    an elastic member arranged at a coupled position between the lug unit and the head,
    wherein the elastic member is protrusively disposed at a side surface of the lug unit in a lengthwise direction of the linear screw shaft, and wherein the elastic member comprises a first elastic member in contact with one surface of the lug accommodation groove and a second elastic member in contact with another surface of the lug accommodation groove.

2. The swivel actuator of claim 1, wherein the linear screw shaft is formed with a screw thread at its periphery, one end of the linear screw shaft being connected to a rotation shaft of the driving motor, the other end being rotatably connected to a rotation accommodation unit provided to a base.

3. The swivel actuator of claim 1, wherein the nut member includes a linear screw shaft coupling hole formed with a female screw unit gear coupled to the linear screw shaft.

4. The swivel actuator of claim 3, wherein the elastic member is protrusively formed at a periphery of the lug unit.

5. The swivel actuator of claim 1, wherein the elastic member includes any one of a rubber member, a tension rib and a leaf spring.

6. The swivel actuator of claim 1, wherein the elastic member is arranged adjacent to a distal end of the lug unit.

7. The swivel actuator of claim 1, wherein the lug unit takes a shape of a cylinder, and wherein the lug accommodation groove of the head is formed with a width greater than a diameter of the lug unit and is formed with an opening and a pair of lateral walls gripping the lug unit.

8. The swivel actuator of claim 7, wherein the elastic member is protrusively formed on a surface of the lug unit opposite to the lateral walls.

* * * * *